Patented July 3, 1962

1

3,042,724
PREPARATION OF NAPHTHALENETHIOL
David S. Hoffenberg, Stamford, and Robert G. Haldeman, Norwalk, Conn., and William B. Hardy, Bound Brook, N.J., assignors to American Cyanamid Company, New York, N.Y., a corporation of Maine
No Drawing. Filed Sept. 22, 1959, Ser. No. 841,440
4 Claims. (Cl. 260—609)

This invention relates to a process for the preparation of naphthalenethiols. The invention also relates to an improved process for the preparation of naphthalenethiols from a naphthol and hydrogen sulfide in a vapor phase catalytic reaction.

The prior art teaches a variety of methods for the preparation of mercaptans. However, the preparation of aromatic mercaptans or thiols in the vapor phase has not been explored as critically perhaps as that of the aliphatic mercaptans. Some methods, of course, are known for the preparation of aromatic mercaptans but most, if not all, of these methods are accompanied by severe limitations and many objectionable features such as low product yields, high processing costs, and costly equipment requirements.

In one known method for the preparation of aromatic mercaptans, an aromatic halogen compound is heated with hydrogen sulfide at a high temperature with or without contact agents to produce the corresponding aromatic mercaptan. Another method which is known is a liquid phase reaction wherein naphthalene is reacted with a sulfurizing agent in the presence of a sulfurization catalyst and subsequently the resulting sulfurized naphthalene is reduced to naphthalenethiol. These methods, however, are beset with several costly processing steps.

Still another method, e.g. that disclosed in U.S. Patent No. 2,438,838, to Ballard et al., employs a phenolic compound as the starting material and this compound is reacted with hydrogen sulfide over certain oxide dehydration catalysts at 400–600° C. and at elevated pressures. While this last mentioned method appears to be the more direct method for the preparation of thiophenols, it nonetheless still suffers from a marked disadvantage, viz., super-atmospheric pressures must be employed. Pressures above two atmospheres, and specifically those above 200 pounds per square inch, are generally employed in this last mentioned method.

However, it has now been discovered that high yields of aromatic mercaptans and more specifically naphthalenethiol (which is also known as naphthyl mercaptan, mercaptonaphthalene or thionaphthol) may be obtained by reacting hydrogen sulfide with a naphthol at elevated temperatures at pressures substantially atmospheric in the presence of a metal oxide dehydration catalyst.

This invention, therefore, overcomes the necessity of employing high pressure equipment such as that known to be required for the preparation of thiophenolic compounds. As a result naphthalenethiol may be synthesized in a far less expensive and a much more convenient manner. The merits of such an improved synthesis are obvious since it is now possible to prepare naphthalenethiol at a considerably lower cost and at faster production rates. Thus naphthalenethiol is able to be employed in even wider applications as a chemical intermediate. The acceptance of naphthalenethiol as a catalytic rubber plasticizer and as a valuable intermediate in the preparation of thio indigo type dyes has of course already been established.

The catalytic vapor phase reaction of the present invention surprisingly takes place at substantially atmospheric pressure with yields up to 70% at conversions of up to about 80% being obtained which yields and conversions are based on the amount of naphthol employed as the starting material. Mol ratios of hydrogen sulfide to naphthol in the feed stream of from about 1:3 to about 3:1 may be employed with a mol ratio of from about 1:2 to 1:1 preferred. The temperature of the vapor phase reaction may be in the range from about 350° to about 600° C. with temperatures from about 400° to about 525° C. being preferred.

Although numerous metallic oxides may be employed as the catalytic materials for this process, it is preferred to use thorium oxide or thoria. While it is possible to use a thoria catalyst unsupported, it is preferred that a low surface silica type of support be employed. A polysurface silica such as that marketed as SEHF by the Carborundum Company is found to be particularly advantageous in the present process although it will be obvious that many other types of catalyst supports may be used. When a supported thoria catalyst is employed, its selectivity appears to improve slightly during a run, but its activity is noted to decline. However, the catalyst may be regenerated with air or other materials and thus the normal activity of the catalyst may be restored. The surface of the catalyst may be kept clean by employing steam or other diluents.

The naphthalenethiol may be prepared in a continuous, semi-continuous, or batch process. It is preferred however, to employ a batch process. Moreover, if the activity of the catalyst is maintained at a high level continuously a continuous process may be also desirably employed.

The reactants may be premixed before entry into the reaction vessel or the naphthol and hydrogen sulfide may be fed to the reaction vessel through separate inlets. The latter method is generally preferred, however.

It should also be mentioned that the reactants may be preheated to a lesser or greater degree before being led into the reaction vessel and such procedure is usually preferable, but not absolutely necessary.

While the apparatus employed in the production of naphthalenethiol constitutes no part of the present invention, a brief description of the apparatus which may be employed is deemed to be helpful in understanding the method of preparation of naphthalenethiol. The apparatus which may be employed consists of a Pyrex reactor which is maintained at reaction temperature in a furnace equipped with a bronze block for heat transfer. The reactor is packed with an 8 inch layer of ⅛ inch silicon carbide spheres on top of which is an 8½ inch bed of the thoria catalyst. On top of the catalyst is placed another layer of silicon carbide spheres which zone serves as a pre-heating and mixing zone. The naphthol compound is heated in a flask and is transferred to a displacement feeding system heated at 130–140° C. From this feeder, the naphthol is displaced by a stainless steel piston into a Pyrex vaporizer-preheater from which it is swept into the reactor maintained at the reaction temperature by a metered stream of an inert diluent such as steam or nitrogen or carbon dioxide or by hydrogen sulfide which enter another port of the preheater-vaporizer.

The product is collected in a tared receiver which is set into wet ice traps connected in series. The non-condensable gases are vented. At the conclusion of a run, the naphthol feed is discontinued while hydrogen sulfide is allowed to sweep the reactor for a period of time. Then a nitrogen stream is used to sweep the reactor for an additional length of time.

Following the completion of a run, the reactor effluent, usually a yellow-orange oil which solidifies on cooling and which contains globules of by-product water, may be worked up by a procedure which takes advantage of the acidity of naphthalenethiol and the ease of oxidation of its sodium salt to dinaphthyl disulfide. To the crude reaction product is added a 10% sodium hydroxide solution. The mixture is then placed on a steam bath and heated at 50–60° for 30–40 minutes. After cooling to room temperature, the alkali insoluble material is removed by filtration and a stream of air which is passed through a tower of sodium hydroxide pellets, is bubbled into the heated (60–70° C.) filtrate. Following the oxidation with air the precipitated dinaphthyl disulfide is collected, dried, and weighed. The filtrate from the oxidation reaction is then acidified and unconverted naphthol recovered. The dinaphthyl disulfide may then be readily reduced to the thiol, if desired.

In runs wherein beta naphthol is treated with hydrogen sulfide to yield 2-naphthalenethiol, reaction products usually contain the following materials: beta naphthol, 2-naphthalenethiol, 2,2'-dinaphthyl sulfide, 2,2'-dinaphthyl disulfide, naphthalene and 2,2'-dinaphthyl.

The advantages of this invention are illustrated by the following illustrative, but non-limiting examples in which all parts given are by weight unless otherwise stated:

EXAMPLE 1

*Preparation of Catalyst*

To a solution of 122 parts of thorium nitrate tetrahydrate in 500 parts of water is added 191 parts of 6–8 mesh SEHF polysurface silica pellets. These pellets are available from the Carborundum Company and are described as polysurface silica. The solution is then evaporated to dryness on a rotating film evaporator and the dry pellets are heated in an oven at 120° C. for 6 hours. The nitrate is converted to the oxide by heating the catalyst in a stream of air at 270° C. for 5 hours followed by an additional heating with air for 12 hours at 400° C.

EXAMPLE 2

*Preparation of Naphthalenethiol*

A feed stream consisting of 2-naphthol vapors (0.35 mol per hour) and hydrogen sulfide (0.77 mol per hour) is passed through a Pyrex reactor heated to a temperature of 490° C. and which contains 150 parts of a supported thoria catalyst. After one hour reaction time the condensed reactor effluent is separated by extraction of 2-naphthalenethiol and unreacted 2-naphthol with 10% caustic solution, followed by removal of the alkali insoluble material by filtration and precipitation of the 2-naphthalenethiol as the corresponding disulfide by air oxidation. Following the isolation of dinaphthyl disulfide, unconverted 2-naphthol is recovered by acidification of the filtrate. A 60% conversion of the naphthol is obtained and a 65% yield of 2-naphthalenethiol based upon the naphthol consumed is obtained.

EXAMPLE 3

The catalyst employed in Example 2 is regenerated with air for one hour at 490° C. and the bed temperature is raised to 530° C. A feed stream of 2-naphthol (0.7 mol per hour) and hydrogen sulfide (0.59 mol per hour) and one volume percent of hydrogen is passed through the catalyst bed for a period of two hours. A 78% conversion of 2-naphthol and a 61% yield of 2-naphthalenethiol are obtained which results are further confirmed by mass spectroscopic analysis of the condensed effluent. In addition, there is also obtained an 8% yield of 2,2'-dinaphthyl disulfide, which is readily convertible to 2-naphthalenethiol.

EXAMPLE 4

The temperature of the catalyst bed is lowered to 410° C. and essentially the same feed stream as that employed in Example 2 is passed through the catalyst bed. The reactor effluent is then treated with alkali and the pH adjusted to 8.0. The mixture is then filtered and the filtrate is acidified and the unconverted 2-naphthol is recovered. A 35% conversion to naphthalenethiol is obtained and the purity of the naphthalenethiol is 92%.

EXAMPLE 5

The isolation of 2-naphthalenethiol is greatly simplified by carrying the reaction of 2-naphthol with hydrogen sulfide to complete conversion. This is accomplished at 575° C. and a 5:1 hydrogen sulfide:2-naphthol mol ratio at a space velocity of 130 volumes of gas (calculated at reaction temperature) per part of catalyst per hour. Under these conditions a 50% yield of 2-naphthalenethiol is obtained.

We claim:

1. A process for the preparation of naphthalenethiol which comprises reacting a naphthol with hydrogen sulfide in the presence of a thoria dehydration catalyst at substantially atmospheric pressure and at a temperature of from about 350° C. to about 600° C.
2. A process as in claim 1 in which the naphthol is 2-naphthol.
3. A process as in claim 1 in which the ratio of naphthol to hydrogen sulfide is in the range from about 1:3 to about 3:1.
4. A process as in claim 1 in which the temperature is 450° C. to 525° C.

References Cited in the file of this patent

UNITED STATES PATENTS

| | | |
|---|---|---|
| 2,402,613 | Farlow et al. | June 25, 1946 |
| 2,438,838 | Ballard et al. | Mar. 30, 1948 |
| 2,903,484 | Hardy et al. | Sept. 8, 1959 |